United States Patent [19]
Staley

[11] 3,874,539
[45] Apr. 1, 1975

[54] FORK LIFT TRUCKS

[75] Inventor: David Robert Staley, Bedfordshire, England

[73] Assignee: Lancer Boss Limited, Leighton Buzzard, England

[22] Filed: Apr. 9, 1973

[21] Appl. No.: 349,046

[30] Foreign Application Priority Data
Apr. 17, 1972 United Kingdom............. 17628/72

[52] U.S. Cl.......... 214/674, 214/DIG. 7, 280/150 C, 296/66
[51] Int. Cl.............................................. B66f 9/20
[58] Field of Search........... 214/670, 671, 672, 673, 214/674, DIG. 7; 280/150 C; 296/63, 65 R, 65 A, 66, 102, 107

[56] References Cited
UNITED STATES PATENTS
3,051,259  8/1962  Lorenz............................. 180/89 A
3,289,871  12/1966  Tourneau et al.................. 214/674

Primary Examiner—Robert J. Spar
Assistant Examiner—Lawrence J. Oresky
Attorney, Agent, or Firm—Karl W. Flocks

[57] ABSTRACT

A battery operated fork lift truck comprising a chassis supporting a pivoted mast at one end thereof, tiltable fore and aft of the truck by a power operated means, a battery mounting at the other end portion of the chassis, a load guard having its mast end uprights tiltable fore and aft of the truck and its portion above the battery mounting connected to the mast end uprights and detachably connected to the battery end portion of the truck and a link pivoted to the mast end of the load guard and/or detachably pivotable to the mast, whereby when the link is pivotally connected to the mast and load guard the mast may be tilted by the power operated means thereby tilting the load guard to displace the portions of the load guard adjacent the battery out of the path of lifting tackle employed to replace the battery on the truck.

6 Claims, 3 Drawing Figures

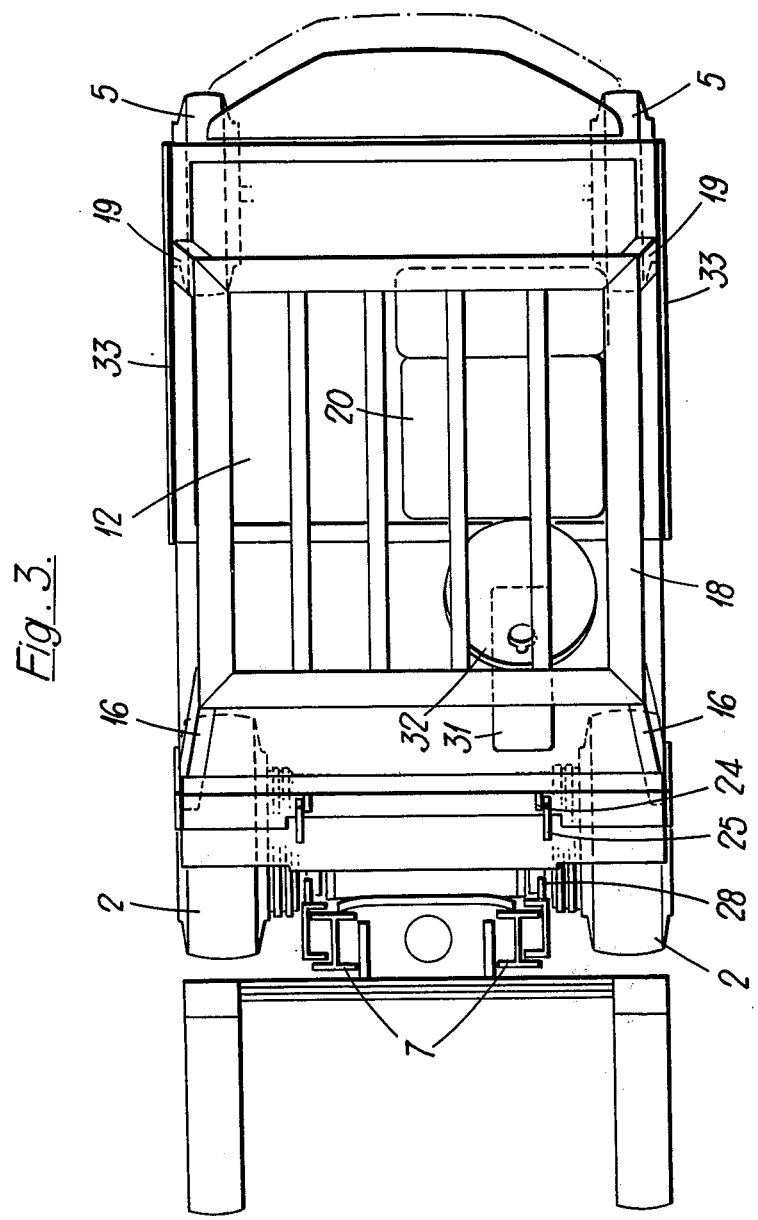

FORK LIFT TRUCKS

BACKGROUND OF THE INVENTION

1. Field of the Invention

This invention relates to fork lift trucks and more particularly to battery operated fork lift trucks.

2. Description of the Prior Art

Known battery operated fork lift trucks have a three or four wheeled road chassis with an electric motor drivingly connected to one of the road wheel axles, usually the front road wheel axle. The motor is supplied with electric current from a battery detachably mounted on the chassis towards the rear of the chassis. The driver-operator's seat is located above the battery with the steering wheel and driving controls in front of the seat. The steering is hydraulically operated through flexible pipelines from the steering valve while the motor controls are connected to the motor through flexible conducting cables and the vehicle brakes are operated from the driving controls by hydraulic pipelines and/or flexible cables. The fork mast is pivoted at its lower end about a horizontal axis to the lower portion of the front of the chassis or to the drive axle, a hydraulic ram or rams controlled from the driver-operator's seat being connected between the chassis and the mast to tilt the mast rearwardly or forwardly from a central substantially vertical position. A load guard is erected on the chassis to protect the driver-operator and comprises uprights behind the driver-operator's seat on each side of the chassis connected by a horizontal frame above the driver to the top ends of uprights in front of the steering wheel rising from the front of the chassis behind the mast. The forward load guard uprights usually slope rearwardly to permit the rearward tilt of the mast. The weight of the battery forms at least part of the counterbalance weight necessary at the rear of the vehicle to balance the vehicle when the forks on the mast are loaded. Such batteries have a productive life of several hours but have to be recharged for several hours from a main supply or electric generator. It is therefore necessary to change the batteries for recharging so that the trucks can be kept in operation. The removal of a battery and replacing it in the vehicle with a recharged battery, due to the substantial weight of the batteries, e.g. several hundredweight, necessitates the use of lifting tackle such as a crane or another fork lift truck. The battery has to be lifted from its seating in the chassis and then swung sidewardly and the load guard must be constructed to avoid interference with the lifting tackle. In known battery operated fork lift trucks, the upper part of the load guard has to be cut away or shaped and may have removeable or hinged parts, for this purpose which increases the cost of its construction.

The main object of the present invention is to provide a battery operated fork lift truck in which the aforesaid disadvantages is overcome by providing rapid access to the battery for replacement.

SUMMARY

According to the present invention a battery operated fork lift truck comprises a chassis supporting a pivoted mast at one end thereof, tiltable fore and aft of the truck by a power operated means, a battery mounting at the other end portion of the chassis, a load guard having its mast end uprights tiltable fore and aft of the truck and its portion above the battery mounting connected to the mast end uprights and detachably connected to the battery end portion of the truck, and a link pivoted to the mast end of the load guard and/or detachably pivotable to the mast, whereby when the link is pivotally connected to the mast and load guard the mast may be tilted by the power operated means thereby tilting the load guard to displace the portions of the load guard adjacent the battery out of the path of lifting tackle employed to replace the battery on the truck.

Preferably the uprights of the load guard above the battery are rigid with a substantially horizontal frame and their lower ends are detachably connected to the chassis or battery box in which the battery is housed. The driver-operators seat may be fast with the last named uprights, and if desired the steering wheel with its mounting is fast with the other load guard uprights.

Thus by providing the battery with fork engaging means and/or crane hook connections, the battery can be quickly lifted from and replaced in the vehicle once the load guard has been tilted out of the path thereof.

BRIEF DESCRIPTION OF THE DRAWINGS

FIG. 3 is a plan view of the truck in FIG. 1.

In the drawings, the same references designate the same parts.

DESCRIPTION OF PREFERRED EMBODIMENT

Figure 1:
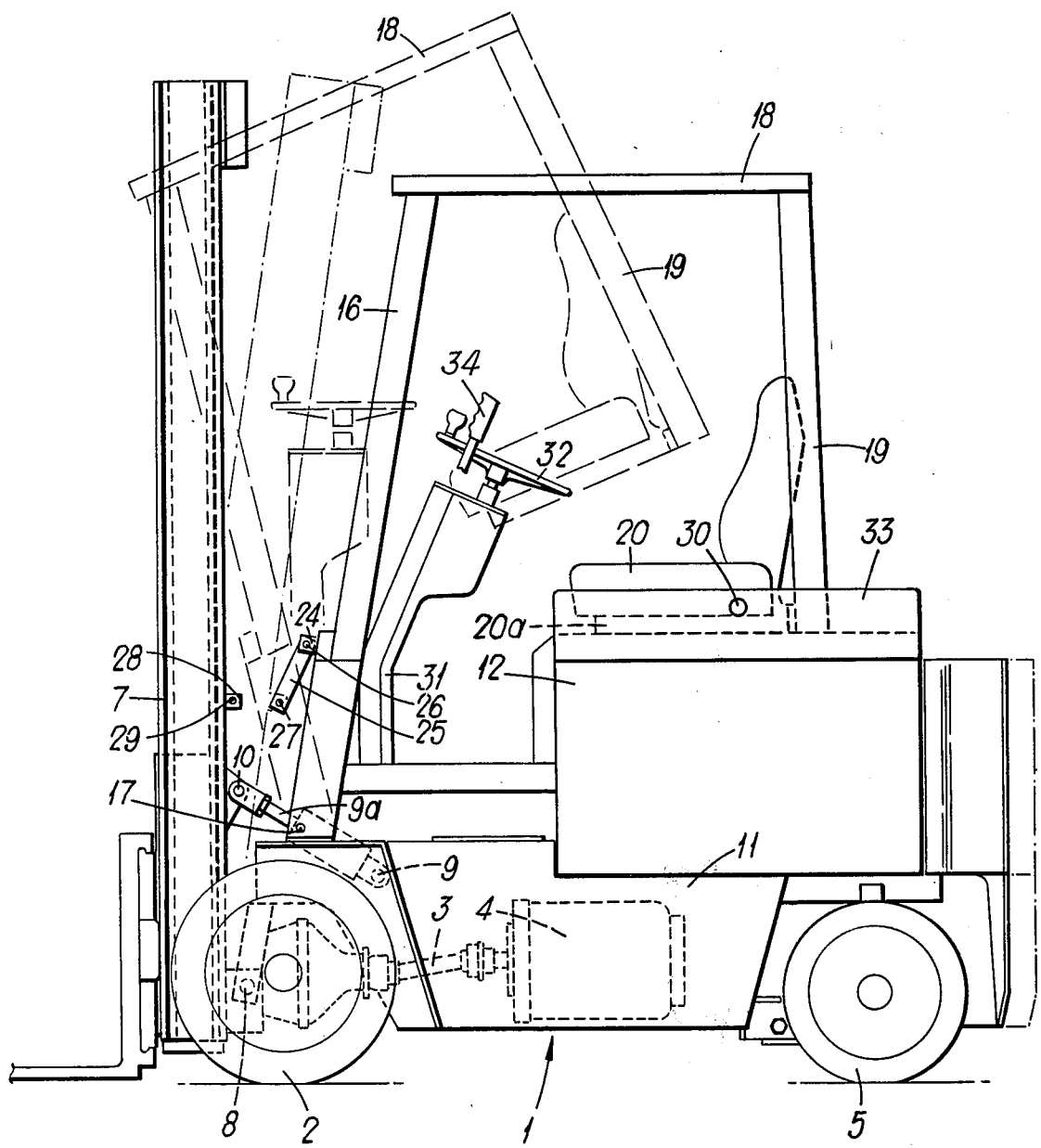
FIG. 1 is a side view of a battery operated fork lift truck.
Figure 2:
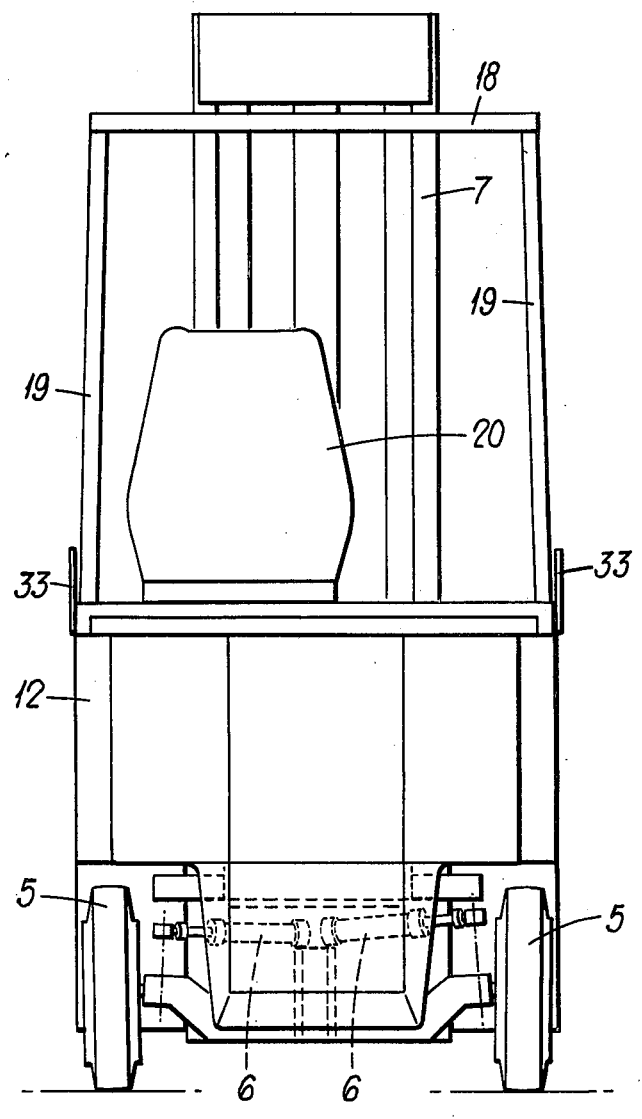
FIG. 2 is an end view from the right of FIG. 1.

Referring to the drawings, the truck has a chassis indicated generally at 1, with front road wheels 2 driven through a transmission 3 by an electric motor 4 supported on the chassis. The rear wheels 5 of the chassis are shown steerable by hydraulic rams 6. A fork mast 7 is pivoted at 8 to the front end of the chassis and hydraulic rams 9a are pivoted at 9 to the chassis and at 10 to the mast, so that by extending or retracting the rams the mast can be tilted forwardly or rearwardly. The chassis has a seat or mounting 11 for a battery 12 which may be held in place on the chassis by a locking pin passing through bores in the chassis and a bracket on the battery (not shown).

A load guard has forward uprights 16 pivoted at their lower ends at 17 to the chassis while their upper ends are secured to a frame 18 the rear of which is connected to rear uprights 19. A driver-operator's seat 20 is mounted via a framework 20a on the uprights 19 to tilt therewith when the guard is tilted forwardly as will be described. The lower ends of the uprights may have bores which when they are in the lowered position come below the brackets mounted on the battery top or on the chassis, and in this case locking pins are passed through these bores to lock the load guide in this lowered position.

The uprights 16 are provided on one or both sides of the vehicle with brackets 24 to each of which is hinged a link 25 on a pin 26, the free end of the link having a bore 27. The mast upright 7 has a bracket 28 with a bore 29 and the link 25 can be pivotally connected thereto by a removable pin passed through the bores 27, 29 when they are in register.

The uprights 16 of the load guard support a steering column 31 with its steering wheel 32 and this is connected via a valve to the steering ram or rams 6 of the rear wheels 5 through flexible pipe lines (not shown). Other controls, such as control 34, for actuating the forks and the mast to lift the load, tilting the mast by the rams 9a actuating the vehicle brakes and so on, are disposed on the steering column and/or a control panel and/or uprights 16 and connected to the devices they actuate by flexible piping, cables or the like.

The battery top has upstanding members 33, one at each side with central holes 30, therein to receive the hook of a lifting device such as a crane; apertures may be provided in addition to or as an alternative to these holes to receive the forks of another fork lift truck for lifting the battery.

Any type of battery may be employed, for example a secondary battery.

In normal operation of the truck the driver operator occupies the seat 20 with the load guard in the lowered position to drive the truck and to operate the forks. When it is desired to change the battery 12 for recharging the driver-operator leaves the seat, the locking pins when used, are withdrawn, and the mast 7 is tilted backwards by operation of the ram 9a so that the bore in the link 25 can be brought into register with the bore 29 on the mast bracket 28. A pin is then used to connect the link 25 pivotally to the mast. The ram 9a is then extended to tilt the mast forwards thereby through the link 25 tilting the load guard forwards about the pivot 17 until it reaches the position shown in broken lines in FIG. 1.

The crane or other fork lift truck is then engaged with the members 33 on the battery which can then be lifted to be clear of its mounting without fouling the forwardly tipped load guard. A recharged battery can be mounted in the truck by the reverse procedure.

In this description the left hand part of the vehicle in FIG. 1 is described as the front but it will be understood it may constitute the rear of the vehicle.

It will be seen that existing vehicles can be adapted to the construction of the invention by fixing the brackets 24, 28 to the load guard and mast respectively, pivoting the uprights 16 to the chassis and where required providing the locking pin connections to the uprights 19 or the chassis.

By the construction of the invention a standard load guard can be quickly operated to permit rapid removal and replacement of batteries thus cutting down the time a truck is out of operation for this purpose.

I claim:

1. A battery operated fork lift truck comprising
a chassis,
a mast pivotally supported at one end of said chassis,
power operated means mounted on said chassis and operable to tilt said mast fore and aft of the truck,
a battery mounting near the other end of said chassis having a battery therein,
a load guard including a rigid structure with front and rear uprights rigidly connected at their upper ends by a rigid substantially horizontal protective frame and rigidly connected at their lower ends by a base frame to which a driver's seat is secured,
a steering wheel and control panel for the truck attached to said load guard for movement therewith,
said load guard being tiltable about its lower front end in a fore and aft direction of the truck,
detachable locking means for locking the rear lower end of said structure to the truck at the upper part of said battery mounting,
and a linking means detachably, pivotally mounted between said load guard at the end toward said mast and said mast, to pivotally connect said load guard to said mast, to tilt said mast and said load guard forward of its initial position and back to its initial position by operation of said power operated means whereby said load guard, seat, steering wheel, and control panel are pivoted out of the path of clearance required for replacing said battery in said battery mounting.

2. A truck according to claim 1 wherein said linking means is a rigid structure.

3. A battery operated fork lift truck comprising
a chassis,
a mast assembly supported at one end of said chassis and including fork carriage means mounted for movement on said mast assembly,
battery mounting means near the other end of said chassis for mounting a battery thereon,
power operated means connected to said mast assembly to cause movements of said mast assembly,
a rigid load guard having front and rear uprights interconnected lengthwise and transversely at their upper ends by a protective frame and rigidly connected at their lower ends,
said load guard being in the form of a unitary assembly with a truck steering wheel and truck control, and tiltable at its mast assembly end with respect to said chassis,
and a linking means detachably, pivotally mounted for connection between said load guard and said mast assembly, to connect said load guard for pivoting of said load guard about its mast assembly end to dispose said guard out of the path of removal of a battery from said battery mounting means and return it to its initial position upon actuation of said power operated means when said linking means is attached between said load guard and said mast assembly.

4. A truck according to claim 3 wherein said linking means is a rigid structure.

5. A battery operated fork lift truck comprising a chassis,
a mast assembly supported at one end of said chassis and including fork carriage means mounted for movement on said mast assembly,
battery mounting means near the other end of said chassis for mounting a battery thereon,
power operated means connected to said mast assembly to cause movements of said mast assembly,
a rigid load guard having front and rear uprights interconnected lengthwise and transversely at their upper ends by a protective frame and rigidly connected at their lower ends,
said load guard being in the form of a unitary assembly with a truck steering wheel and tiltable at its mast assembly end with respect to said chassis,
and a linking means detachably, pivotally mounted for connection between said load guard and said mast assembly, to connect said load guard for pivoting of said load guard about its mast assembly end to dispose said guard out of the path of removal of a battery from said battery mounting means and return it to its initial position upon actuation of said power operated means when said linking means is attached between said load guard and said mast assembly.

6. A truck according to claim 5 wherein said linking means is a rigid structure.

* * * * *